United States Patent
Strong

[19]

[11] Patent Number: 5,905,194
[45] Date of Patent: May 18, 1999

[54] PIPE LINE WITH INTEGRAL FAULT DETECTION

[76] Inventor: Thomas P. Strong, 1895 Berwyn Rd, Lafayette, N.Y. 13084

[21] Appl. No.: 08/975,828

[22] Filed: Nov. 21, 1997

[51] Int. Cl.$^6$ ............................. G01M 3/16; G01R 31/11
[52] U.S. Cl. ...................... 73/40.5 R; 73/49.1; 324/532; 324/533
[58] Field of Search .............................. 73/40.5 R, 49.1; 324/532, 533

[56] References Cited

U.S. PATENT DOCUMENTS

| | | | |
|---|---|---|---|
| 3,600,674 | 8/1971 | Roberts et al. | .................. 73/40.5 R X |
| 4,970,467 | 11/1990 | Burnett | ................................. 324/532 X |
| 5,270,661 | 12/1993 | Burnett | ................................. 324/532 X |

FOREIGN PATENT DOCUMENTS

| | | | |
|---|---|---|---|
| 3016223 | 11/1980 | Germany | ................................. 324/533 |
| 3116747 | 8/1982 | Germany | ................................. 73/49.1 |
| 57-114832 | 7/1982 | Japan | ................................. 73/40.5 R |
| 58-129232 | 8/1983 | Japan | ................................. 73/40.5 R |

*Primary Examiner*—Daniel S. Larkin
*Attorney, Agent, or Firm*—Bond, Schoeneck & King, LLP; Stephen B. Salai

[57] ABSTRACT

A pipe line with integral fault detection and localization capability includes an inner electrically conductive pipe line element; a layer of dielectric material coaxial with the inner pipe line element, and an outer conductive coaxial element which, in combination with the inner pipe line element and the dielectric layer forms a coaxial transmission line for transporting fluids over long distances, and identifying and localizing faults.

24 Claims, 4 Drawing Sheets

PIPE LINE WITH INTEGRAL FAULT DETECTION

FIELD OF THE INVENTION

This invention relates generally to pipelines, and more particularly to a buried remote or otherwise inaccessible pipeline having a construction that allows faults, such as leaks, to be detected and located without direct access to the location of the fault.

The advantage of providing apparatus associated with a pipeline, particularly a buried pipeline, for localizing faults such as leaks has been recognized for some time. A number of different but related approaches to this problem have been used. Among these are a number of variations on what we will refer to as the sensor wire technique. In accordance with this technique, a sensor wire is positioned adjacent to the pipeline, so that a fluid escaping from the pipeline comes in contact with the sensor wire, and changes some characteristic of the sensor wire that can be measured remotely. One of the first approaches utilizing this technique employed a sensor wire having a known resistance per unit length. By measuring the resistance of the sensor wire (usually a pair of wires) at one end, the location of a fault bridging the sensor wires could be determined by measuring the resistance. While this approach allowed the location of a fault to be identified generally, it was not particularly precise, and especially in the case of buried pipelines, a substantial amount of digging was often needed to find the actual fault.

An improvement on the resistance wire technique employed a transmission line positioned in close proximity to the pipe. By applying high frequency pulses to one end of the transmission line, and measuring the time required for reflections to return to that end from a fault, the location of the fault could be determined. This technique is known generally as time domain reflectometry (TDR), and the techniques for making TDR measurements are per se well known.

The use of a transmission line positioned adjacent to a pipeline, in combination with the TDR measurement technique greatly improved the precision with which the fault could be located. Accuracies of a few feet or better could be obtained over relatively long distances.

A disadvantage of the transmission line and time domain reflectometry measurement system is that when a leak occurs, not only must the leak be repaired, but the transmission line was often damaged at the point of the leak and had to be repaired as well. Moreover, the additional cost associated with providing a transmission line closely adjacent to a sometimes very long pipeline is substantial. The use of a transmission line positioned adjacent to a pipeline is a good but not optimum way of localizing faults in the pipeline.

It is an object of this invention to provide a method and apparatus for localizing pipeline faults that overcomes the disadvantages of the prior art.

It is a more particular object of this invention to provide a method and apparatus for localizing faults in pipelines that does not require that an additional transmission line or other device be disposed along the length of the pipeline.

Briefly stated, and in accordance with one aspect of the present invention, a pipeline with integral fault detection and localization capability includes an inner electrically conductive pipeline element; a layer of dielectric material coaxial with the inner pipeline element, and an outer conductive coaxial element which, in combination with the inner pipeline element and the dielectric layer forms a coaxial transmission line for transporting fluids over long distances, and identifying and localizing faults.

In accordance with another object of this invention, a time domain reflectometer is coupled to one end of a section of the pipeline, which preferably is terminated a substantial distance away with its characteristic impedance. Pulses are then applied to the pipeline, and the reflections are analyzed to determine whether a fault exists, and if so how far the fault is from the point at which the pulses are coupled to the pipeline.

In accordance with another aspect of the invention, a long pipeline is made up of a plurality of transmission line sections that can be selectively isolated to localize a fault precisely, or connected to allow a fault to be located generally with a smaller number of measurements.

BRIEF DESCRIPTION OF THE DRAWINGS

The novel aspects of this invention are set forth with particularity in the appended claims. The invention itself, together with further objects and advantages thereof may be more readily comprehended by reference to the following detailed description of a presently preferred embodiment of the invention, taken in conjunction with the accompanying drawing, in which:

DETAILED DESCRIPTION OF THE PREFERRED EMBODIMENT

Figure 1:
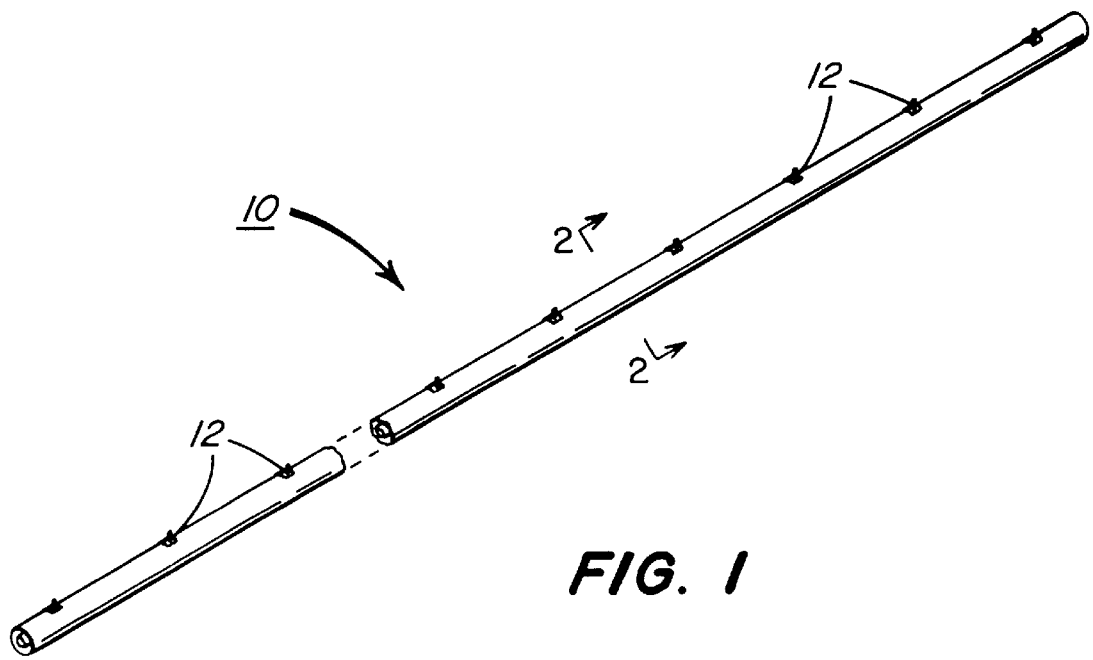
FIG. 1 is a diagrammatic view of a pipeline in accordance with this invention.

Referring now to FIG. 1, a pipeline in accordance with this invention is illustrated diagrammatically. The pipeline 10, which is shown in the figure, may extend over many miles or even thousands of miles. Faults can be localized, at distances up to about 2,000 feet using present techniques, but the distances may increase as the invention is refined. Spaced apart connection points 12 are provided along the length of the pipeline for coupling pulses into the pipeline and terminating the pipeline, so that clean reflected pulses will be produced. It will be understood that while terminating the pipeline to make measurements is preferred, it is also possible to make measurements on an unterminated pipeline, although accuracy may be somewhat reduced. However, the accuracy of measurement is greatest when the distance between the time domain reflectometer measuring instrument and the terminating impedance is lowest, measurements can be made over more than one segment with reduced accuracy. In accordance with one embodiment of the invention, initial measurements may be made over multiple segments, the number and length of which is limited by the attenuation characteristics of the pipeline, and once a fault is located generally, another measurement can be made over a shorter length of pipeline, so that the location of the fault can be determined more precisely.

Figure 2:
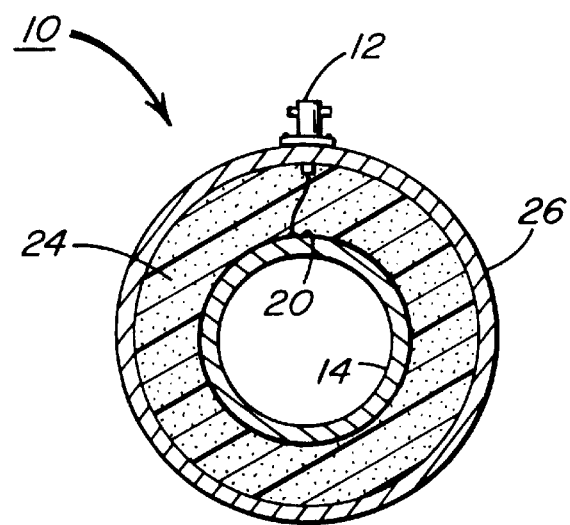
FIG. 2 is a cross-section of the pipeline of FIG. 1.

Referring now to FIG. 2, the construction of the pipeline is shown in more detail in this cross sectional view.

Preferably, an inner pipeline element 14 which may be made from cast iron or another suitable material, depending on the nature of the fluid to be carried by the pipeline, is provided. It is a feature of this invention that as long as the pipeline is made from conductive material, it is not necessary to provide a special inner fluid carrying element to achieve the advantages of this invention. Existing pipeline technology can usually be employed.

However, where it is desired to provide an inner pipeline element that is made from non-conductive material, such as PVC or another plastic, the advantages of this invention can still be obtained by providing an optional metalized layer 20, on surface of the inner pipeline element, preferably on the outer surface, so that the metalized layer will not come in contact with the fluid being transported by the pipeline. Various techniques for metalizing PVC or other non-conductive materials are well known, and any of these techniques may be employed to achieve a conductive layer on a surface of non-conductive inner pipeline element.

In order to provide a transmission line, two elements are added to the inner pipeline element, a dielectric layer 24, and an outer electrically conductive transmission line element, preferably a coaxial tube 26 disposed around the dielectric layer. The coaxial lube may be metal, or a metalized plastic pipe, having a layer of metalization on the inner surface of the pipe. Constructions of the type just described create a coaxial transmission line consisting of the inner pipeline element 14, the dielectric layer 24, and the outer transmission line element 26. The dimensions of the inner pipeline element and the outer electrically conductive transmission line element are preferably selected so that the transmission line has an impedance between about 30 and 95 ohms.

When a leak occurs in the inner pipeline element, the fluid being transported by the pipeline enters the dielectric layer between the inner pipeline element and the outer transmission line element. The presence of fluid in the dielectric layer changes the impedance of the pipeline at the location of the leak, and this change can be measured remotely by the TDR technique.

The manner in which fluid leaking from the inner pipeline element 14 enters the dielectric layer 24 depends on the nature of the dielectric layer. In one embodiment of the invention, an air or inert gas dielectric can be employed, and fluid can readily enter the space between the inner pipeline element and the outer transmission element. While an air dielectric can be employed in accordance with this invention, a pipeline having an air dielectric is not as strong as a pipeline having a more substantial dielectric layer, such as foam, preferably, closed cell plastic foam.

A foam dielectric layer in accordance with this invention provides additional advantages. The foam layer is capable of absorbing fluid leaking from the inner pipeline element, and preventing that fluid from leaking through the outside transmission line element, and possibly polluting the environment.

Leak detection occurs when the inner pipeline element 14 fails, but before any failure of the outside transmission line element 26. While a variety of dielectrics may be employed in accordance with this invention, as discussed to some degree above, a preferred dielectric is made from an open cell foam material which in addition to having suitable dielectric qualities, also has a high capacity to absorb fluids, and thereby greatly contributing to the leakage prevention capabilities of the pipeline in accordance with this invention.

Figure 3:
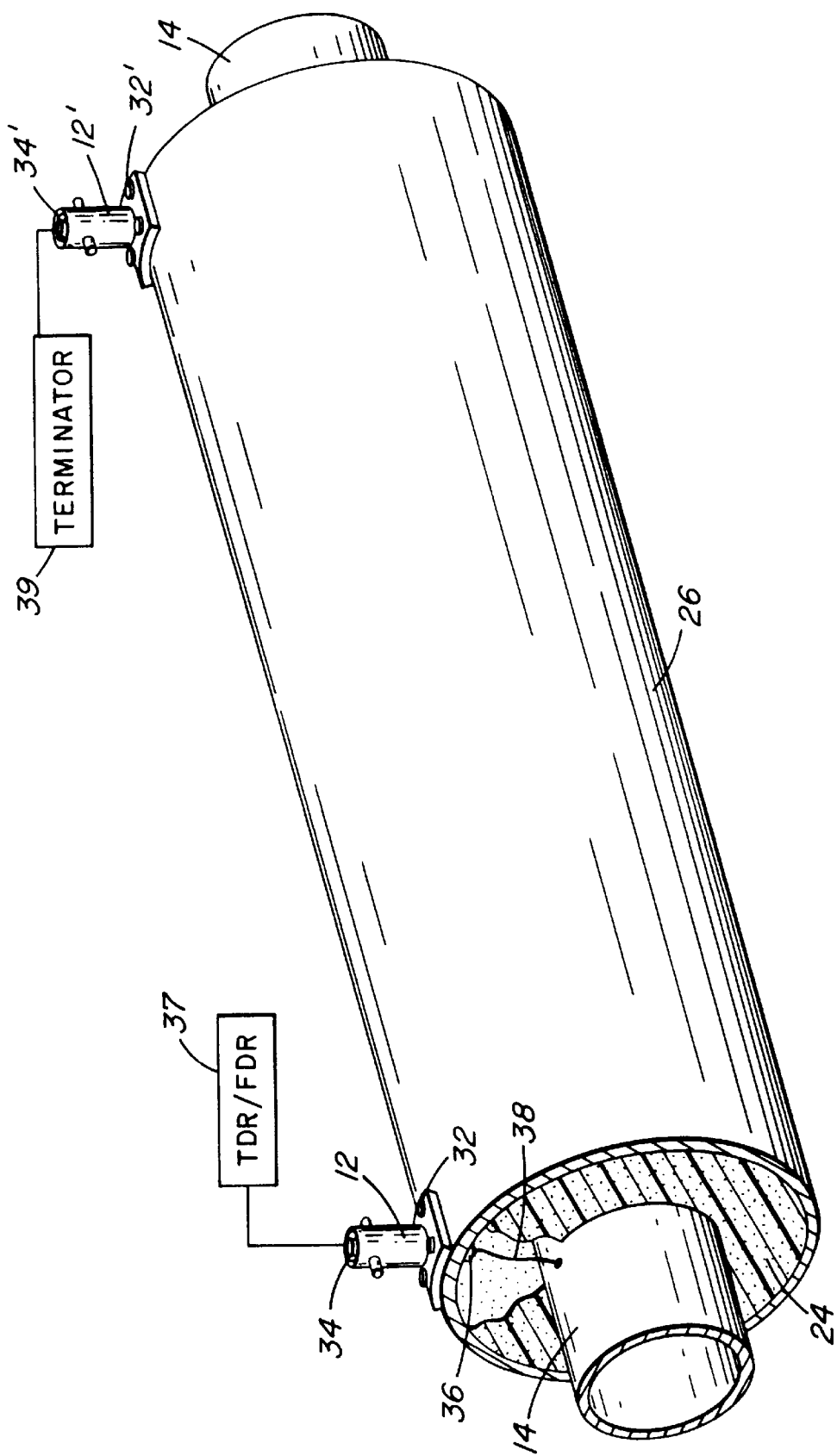
FIG. 3 is an enlarged view of the pipeline in accordance with the invention showing the manner in which pulses are coupled to the pipeline.

FIG. 3 is an enlarged view of a segment of the pipeline of FIG. 1 showing the manner in which pulses are connected to the pipeline. FIG. 3 is diagrammatic to the extent that the inner pipeline element 14 and outer transmission line element 26 are shown as having essentially no thickness.

A first radio frequency connector 12 is attached to the outer transmission line element 26, with a plurality of suitable fasteners 32 32', which may be small screws or rivets, or in the alternative the connector may be welded or otherwise permanently fastened to the outer conductor. The connectors itself, which may be of the so-called BNC type, have an outer shell 34 34' and a center conductor 36. The outer shell 34 is connected to the outer transmission line element 26, while the center conductor 36 is connected by way of an electrical strap or wire 38 to the conductive portion of the inner pipeline element 14.

A second connector 12' is attached to the pipeline at a location spaced apart from connector 12, so that measurements can be taken between the two connectors.

The connectors provide a convenient way to attach a time or frequency domain reflectometer 37 and, if desired, a load resistor or terminator 39 to a segment of the pipe and for making the measurement to localize a leak between the two connectors. The TDR/FDR includes a pulse generator and a pulse detector.

Figure 4:
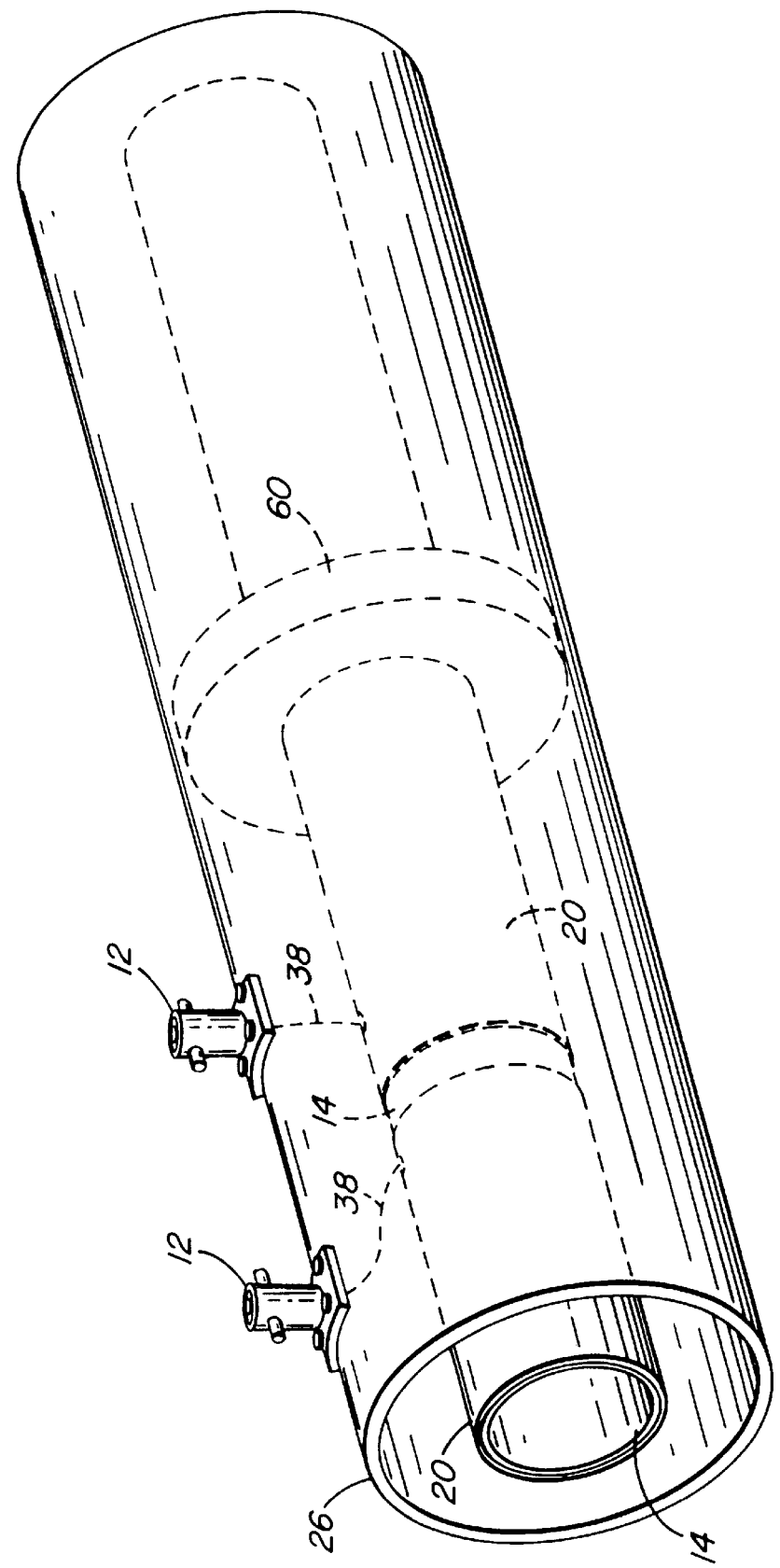
FIG. 4 is a diagrammatic view of a long pipeline having sections that can be measured to localize faults in accordance with the invention.

In accordance with another embodiment of the invention, as shown in FIG. 4, the electrical continuity of either the inner 14 or outer coaxial transmission line 26 elements is interrupted periodically to facilitate coupling of a time domain or frequency domain reflectometer to the pipe, and coupling of a terminating impedance to a remote location on the pipe. Where the inner element, that is the pipeline element itself is formed from a continuous conducting piece, for example, a metal pipe, it is necessary to interrupt the outer coaxial element. However, as shown where the inner conductor is a metalized but otherwise non-conductive pipe, the metalization can be interrupted. While the length of pipeline between interruptions may vary, we have found that 2,000 feet or more is a useful length for each segment.

Preferably, connectors 12 are attached to the interrupted metalization 20 close to the point of the interruption. The method of attachment is the same as shown and described in connection with FIG. 3.

Figure 5:
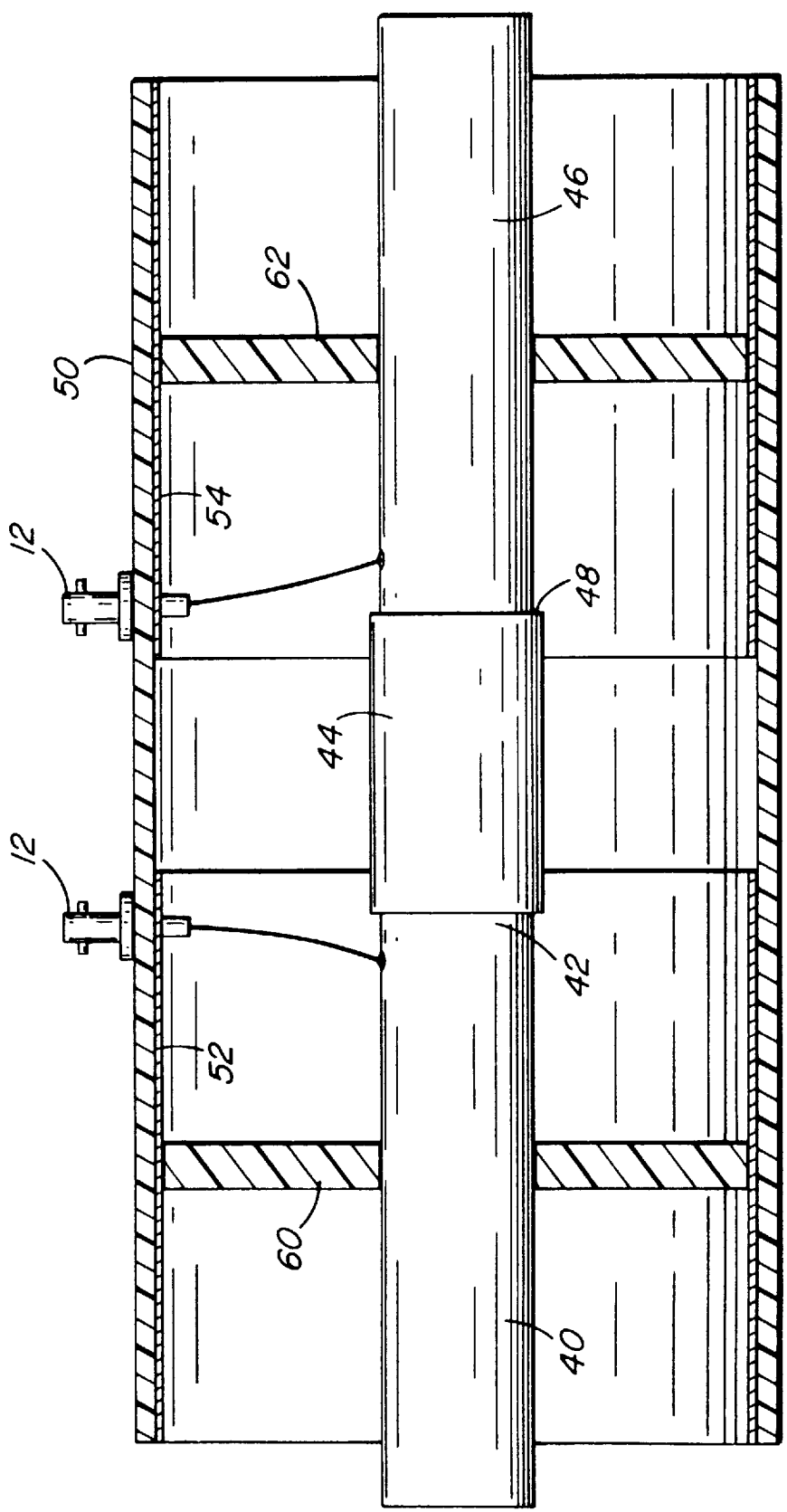
FIG. 5 is a diagrammatic view of an alternative embodiment of the pipeline shown in FIG. 4.

An alternative embodiment of the invention is shown in FIG. 5. A first conductive inner pipeline section 40 is connected at one end 42 to a non-conductive coupling section 44.

A second conductive inner pipeline section 46 is connected to an opposite end 48 of the non-conductive coupling section 44.

The outer coaxial element 50 has a first conductive layer 52 extending substantially coextensive with the first conductive inner pipeline section 40, and a second conductive layer 54 substantially coextensive with the second conductive inner pipeline section 46. The conductivity gaps in the inner and outer pipeline sections improve the isolation between adjacent pipeline sections and permit more precise localization of faults. Spacers 60, 62 maintain the inner pipeline section 46 and the outer coaxial element 50 in coaxial relationship.

While the invention is described in connection with a presently preferred embodiment thereof, those skilled in the art will recognize that any modifications and changes may be made therein without departing from the true spirit and scope of the invention, which accordingly is intended to be defined solely by the appended claims.

What is claimed is:

1. A pipeline for carrying fluids and for detecting and localizing leaks, comprising:

a hollow fluid carrying inner pipeline element having a conductive surface;

an outer conductive transmission line element having a conductive surface and arranged coaxially with the inner pipeline element;

a layer of dielectric material disposed between the inner pipeline element and the outer conductive transmission line element;

a pulse generator connected to the inner pipeline element and the outer conductive transmission line; and a pulse detector connected to the inner pipeline and the outer conductive transmission line for detecting reflected pulses caused by fluid leaking into the layer of dielectric material, and determining the location of leaks.

2. The pipeline of claim 1 in which the pulse generator and the pulse detector comprise a time domain reflectometer.

3. The pipeline of claim 1 comprising a plurality of spacers maintaining the inner pipeline element, and the outer transmission line element in coaxial relationship, and in which the layer of dielectric material comprises a gas.

4. The pipeline of claim 3 in which the gas comprises air.

5. The pipeline of claim 3 in which the gas comprises an inert gas.

6. The pipeline of claim 1 in which the pulse generator and the pulse detector comprise a frequency domain reflectometer.

7. An elongated pipeline for carrying fluids and for detecting and localizing leaks, comprising:

a hollow fluid carrying inner pipeline element having a conductive surface;

an outer conductive transmission line element having a conductive surface and arranged coaxially with the inner pipeline element;

a layer of dielectric material disposed between the inner pipeline element and the outer conductive transmission line element;

a plurality of radio frequency connectors coupled to the inner pipeline element and the outer transmission line element at spaced apart locations along the pipeline;

a terminator connected to a first radio frequency connector;

a pulse generator connected a second radio frequency connector; and a pulse detector connected to the second radio frequency connector for detecting reflected pulses caused by fluid leaking into the layer of dielectric material, and determining the location of leaks.

8. The pipeline of claim 7 in which the pulse generator and the pulse detector comprise a time domain reflectometer.

9. The pipeline of claim 7 comprising a plurality of spacers maintaining the inner pipeline element, and the outer transmission line element in coaxial relationship, and in which the layer of dielectric material comprises a gas.

10. The pipeline of claim 9 in which the gas comprises air.

11. The pipeline of claim 9 in which the gas comprises an inert gas.

12. The pipeline of claim 7 in which the pulse generator and the pulse detector comprise a frequency domain reflectometer.

13. The elongated pipeline of claim 7 in which the conductive surface of one of the inner pipeline element and the outer transmission line element is interrupted adjacent the plurality of radio frequency connectors to provide a plurality of isolated transmission line sections.

14. The pipeline of claim 7 in which the dielectric material comprises a layer of plastic foam.

15. The pipeline of claim 14 in which the plastic foam comprises a closed cell foam.

16. The pipeline of claim 14 in which the plastic foam comprises an open cell foam.

17. The pipeline of claim 7 in which the inner pipeline and the outer transmission line elements have diameters selected so that the impedance of the pipeline is between about 30 and about 95 ohms.

18. The pipeline of claim 7 in which the inner pipeline element comprises a conductive metal pipe.

19. The pipeline of claim 7 in which the outer transmission line element comprises a metalized plastic pipe.

20. The pipeline of claim 19 in which the metalized plastic pipe comprises a plastic pipe with a metalized layer on an inner surface.

21. The pipeline of claim 19 in which the metalized plastic pipe comprises a plastic pipe with a metalized layer on an outer surface.

22. The pipeline of claim 7 in which the outer transmission line element comprises a conductive metal pipe.

23. The pipeline of claim 7 in which the inner pipeline element comprises a plastic pipe with a conductive metal layer on an inner surface.

24. The pipeline of claim 7 in which the inner pipeline element comprises a plastic pipe with a conductive metal layer on an outer surface.

* * * * *